Patented Feb. 3, 1931

1,791,215

UNITED STATES PATENT OFFICE

MAX ALBERT KUNZ, OF MANNHEIM, AND KARL KOEBERLE, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

DIBROMODIBENZANTHRONE

No Drawing. Application filed March 9, 1929, Serial No. 345,881, and in Germany March 13, 1928.

The present invention relates to the manufacture of a vat dyestuff which is practically pure dibromodibenzanthrone and which is distinguished by the excellent fastness of the dyeings obtained therewith.

It has already been proposed to act on dibenzanthrone with bromine in an organic solvent, such, for instance, as glacial acetic acid or nitrobenzene, a dyestuff being obtained which dissolves in 96 per cent sulphuric acid to a dull violet solution and dyes the vegetable fibre shades with a very strong blue tinge. The said dyestuff dissolves in nitrobenzene to a violet blue solution with a strong red fluorescence and in aniline to a green blue solution. The blue colorations obtained therewith on cotton are not very fast to light and even less fast than the dyeings obtained with the unbrominated initial material.

We have now found that practically pure dibromodibenzanthrone is readily obtained by acting on dibenzanthrone in chlorosulphonic acid with bromine, which term is meant to include agents furnishing bromine, in the presence of antimony as halogen transporter at temperatures between about 20° and 70° C., the most suitable temperatures being between about 30° and 40° C. The bromination can be carried out with about the calculated amount of bromine, though a slight excess may suitably be employed. When carrying out the process at temperatures above those referred to above as being most suitable, traces of chlorine enter the molecule, which, however, do not detrimentally affect the properties of the dyeings obtained, since the amount of chlorine does not exceed 2 per cent under the conditions stated. The dyestuff obtained according to our invention is clearly distinguished from the above-mentioned known brominated dibenzanthrone by the remarkable fastness of the pure marine blue dyeings obtained therewith. The dyeings are even more fast than those of the initial material and consequently decidedly more fast than those of the known brominated dibenzanthrone. The new product dissolves in nitrobenzene to a pure blue solution with a pure red fluorescence, and in aniline to a pure blue solution showing no fluorescence.

The following examples will further illustrate how the said invention may be carried out in practice, but the invention is not limited thereto. The parts are by weight.

Example 1

460 parts of pure dibenzanthrone are dissolved at ordinary temperature, while stirring, in 4600 parts of chlorosulphonic acid. 270 parts of bromine are slowly run into the said solution to which 40 parts of antimony have been added, stirring being continued for several hours at ordinary temperature which is then slowly raised to between 35° and 40° C. and the reaction mixture maintained at the same temperature until the bulk of the bromine has been consumed. After cooling, the reaction mixture is diluted with about 2000 parts of concentrated sulphuric acid, poured into ice-cooled water and boiled, and the reaction product is filtered by suction and washed until neutral, if desired, after washing it with a dilute solution of soda. The dyestuff, of which an excellent yield is obtained, is a dibromodibenzanthrone according to analysis, dissolves to a pure violet solution in 96 per cent sulphuric acid and dyes cotton from a blue vat with a violet tinge strong, excellently fast marine blue shades.

Example 2

20 parts of bromine are introduced, while stirring, into a solution of 46 parts of pure dibenzanthrone in 460 parts of chlorosulphonic acid, to which 4 parts of antimony have been added. The reaction mixture is then warmed to between 50° and 60° C. and stirred at the said temperature until all of the bromine has been taken up. After cooling, the reaction mixture is diluted with 230 parts of concentrated sulphuric acid, poured onto ice, boiled up and the reaction product is filtered by suction and worked up as usual. It is dibromodibenzanthrone containing a small amount of chlorine showing the same properties as the product described in Example 1.

A dyestuff of the same composition and of about the same fastness properties is obtained by introducing 46 parts of dibenzanthrone into a solution of 20 parts of bromine and 4 parts of antimony in 460 parts of chlorosulphonic acid at about 40° to 50° C.

What we claim is:—

As a new article of manufacture substantially pure dibromodibenzanthrone dissolving in 96 per cent sulphuric acid to a pure violet solution, in nitrobenzene to a pure blue solution with a pure red fluorescence and in aniline to a pure blue solution without fluorescence, dyeing cotton from a blue vat with a violet tinge strong marine blue shades which are faster to light than the dyeings obtained from the unhalogenated initial material.

In testimony whereof we have hereunto set our hands.

MAX ALBERT KUNZ.
KARL KOEBERLE.